JOHN H. MORRIS AND THOMAS B. HARRISON, OF MAQUOKETA, IOWA.

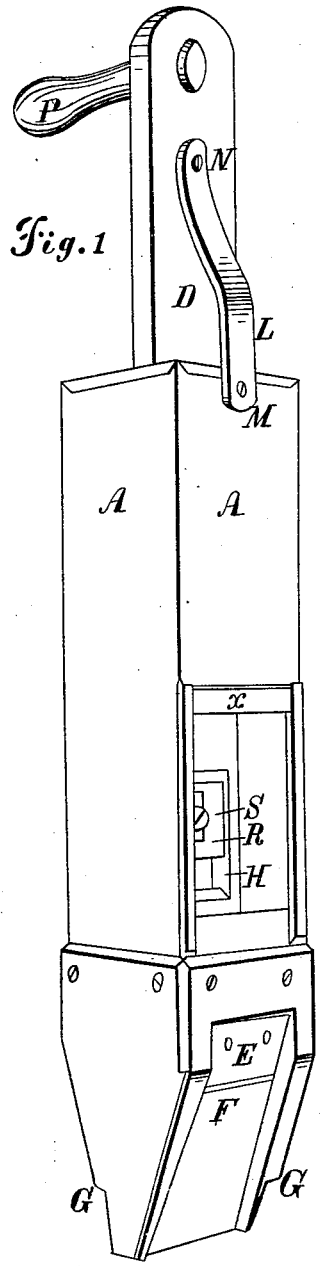
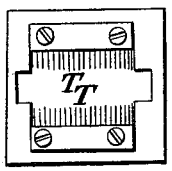
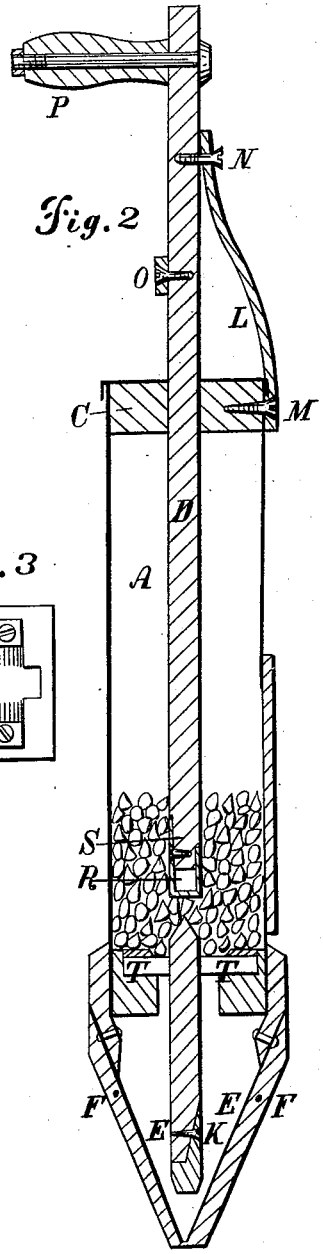

Letters Patent No. 84,435, dated November 24, 1868; antedated November 18, 1868.

IMPROVEMENT IN HAND CORN-PLANTER.

The Schedule referred to in these Letters Patent and making part of the same.

*To all whom it may concern:*

Be it known that we, JOHN H. MORRIS and THOMAS B. HARRISON, both of Maquoketa, in the county of Jackson, and State of Iowa, have invented a new and useful Improvement in Hand Corn-Planters; and we do hereby declare the following to be a full, clear, and exact description of the same, reference being had to the accompanying drawings, making a part of this specification, in which drawings—

Figure 1 is a perspective view, and

Figure 2 is a vertical section, and

Figure 3 is a top view of the lower block, showing the arrangement of the brushes.

A, fig. 1, represents a square tube, formed of tin-plate or other thin sheet-metal, having fitted to its lower end a cast-iron head or box, B.

In the front of the seed-box A is an opening, having two slides or grooves on either side, for the purpose of holding a piece of sheet-glass, forming a small window, X, for the purpose of allowing the amount of grain contained in the seed-box to be seen by the operator; also to be used as an opening for charging the planter with corn or other seed to be planted.

In the top and bottom of the box A are two square blocks of wood, C' C'', having each a central mortise or opening, fitting the size of the piston or plunger D, the lower block being provided with two brushes, fitted in such a manner as to brush or rub against the sides of the plunger D.

The box B is formed of one piece of casting, and is square at the place of attachment on the lower end of the box A, to which it is secured by means of screws, passing through the sheet-metal case A into the wooden block C'. The box or head continues its square form for about one inch downward. It is then tapered on the front and back to an obtuse-wedge point. The sides of the box are made straight, parallel to the sides of the seed-box A. The front and back sides of the head are formed by two converging springs of steel or other elastic metal, secured to bevels by means of rivets or screws, shown at E.

A short distance above the bottom of the points, on the sides of the cast-iron head, are formed two offsets or projections, G G, these projections being made by making the sides thinner from the place of projection downward, the use of these projections being to prevent the point of the planter from pressing too deeply into the soil.

The plunger D is made of such a size as to work freely in an upward and downward direction, through the central openings in the blocks C' C''. The plunger is provided with a mortise or opening, H, the bottom of this opening being bevelled from each side upwards, so that the grain may be readily delivered from either side of the plunger, when the plunger is depressed so as to "drop." This opening is made in the plunger at such a point that when the plunger is pulled upward to the extent of its upward stroke, the opening, H, will be just above the surfaces of the brushes in the lower block, C', as shown in fig. 2.

The bottom of the plunger is provided with a point of cast or wrought-iron, and secured to the plunger by means of a screw or rivet, shown at K, fig. 2. This point is made slightly wedge-shaped on its sides, parallel to the converging spring-plates. The length of the upward stroke of the plunger is determined by the length of the strap L. This strap is secured to the front of the seed-box A by means of a screw, M, and its upper end is attached to the plunger by means of a slit or loop passed over the head of the screw N. The downward stroke of the plunger is determined by means of the block O, formed of leather, rubber, or other elastic material. This block is also secured to the plunger by means of a screw.

The upper end of the plunger is provided with a turned handle, P, fixed at right angles.

In order to adjust the size of the opening or mortise H for various quantities of grain, a slide formed of sheet-metal is made, shown at R, one of its sides having a slot, for the purpose of securing it to the plunger, in any required position, by means of the screw S.

The operation of the machine is as follows:

If the plunger be raised to the position indicated by fig. 2, and the grain-box be filled, the grain will enter the mortise in the plunger from either side. If the plunger be now depressed, the mortise H will pass through the lower block, carrying with it the proper amount of grain to be "dropped," the brushes in the block C' removing all superfluous grain from the outside of the cell or mortise, and when the opening, H, is below the lower surface of the brushes, the grain carried down in the opening, H, will be discharged into the box or head B, and will be pressed into the ground by means of the plunger-point, the points of the springs opening to permit its passage out. When the plunger is raised, the springs will clean off any soil which may adhere to the point of the plunger; and by raising and depressing the plunger, the same operation is repeated.

What we claim as new, desire to secure by Letters Patent, is—

1. The seed-box A, of sheet-metal, cast box B, blocks C' C'', springs E E, plunger D, in combination with the chamber or mortise H, regulating-slide R, and brushes T T, constructed, arranged, and operating as and for the purpose set forth.

2. The seed-box A, in combination with the opening and glass sliding door X, the strap L, screws M and N, and plunger D, constructed, arranged, and operating as described.

3. The combination of the stop-block O, plunger D, blocks C' C'', and seed-box A, constructed substantially as and for the purpose specified.

JOHN H. MORRIS.
THOS. B. HARRISON

Witnesses:
JAS. B. BARNES,
A. FELLOWS.